Patented Nov. 3, 1925.

1,559,984

UNITED STATES PATENT OFFICE.

WILLIAM C. PIVER, OF HILLSIDE, NEW JERSEY.

METHOD FOR MAKING SULPHUR PRODUCTS.

No Drawing. Application filed January 28, 1925. Serial No. 5,402.

*To all whom it may concern:*

Be it known that I, WILLIAM C. PIVER, citizen of the United States, and resident of Hillside, in the county of Union and State of New Jersey, have invented certain new and useful Improvements in Methods for Making Sulphur Products, of which the following is a specification.

The object of this invention is to provide an economical and efficient method for producing a sulphur product in a short period of time and in a finely divided form suitable for use as a fungicide, etc.

In carrying out my method for producing such a sulphur product, I treat a ground or pulverized crystalline sulphur in the presence of an alkaline protein compound, causing a disintegration of the crystalline sulphur and producing a sulphur product in an extremely finely divided state.

As this method has to do with colloidal solutions, a brief summary of the steps leading up to the determination of the method of treatment to produce the required results will be of assistance in obtaining a full understanding of the same.

Many dispersion methods of preparing colloidal solutions are well known. Larger particles are sometimes broken down into finer particles by electrical disintegration, stirring, agitating or grinding in the presence of various electrolytic and non-electrolytic agents and certain precipitated compounds revert to the colloidal form when the excess of the absorbed ions are washed out.

Solid matter in a very fine state of division, though not in colloidal form, may in certain cases and under certain conditions be converted into a colloid. For example, precipitated aluminum hydroxide suspended in water can be converted into a colloid by the addition of minute quantities of hydrochloric acid. Certain forms of iron oxide when treated with water into which small quantities of certain gums have been dissolved convert the oxide of iron into a colloid. Kaolin clays in some instances may be converted into colloids by suspending in water and adding small percentages of either an acid or an alkali.

While it is known that most all glues or gums soluble in water exert more or less of a disintegrating or dispersing effect on certain solid bodies when these solids are in a fine state of division and suspended in water, as a rule these water solutions must contain large quantities of dispersion agents of this character in proportion to the weight of the solids present, especially when the solid is of decided crystalline structure and the particles are not in so fine a state of division as ordinarily it would be possible to obtain by extreme mechanical treatment.

I have found that a water insoluble protein when dissolved or diffused in an alkaline water solution exhibits powerful hydrating and dispersion or disintegration influence on certain crystalline solids, these solids being almost insoluble in all the common solvents used, with few exceptions, indicating at once that extraordinary methods are necessary to disperse or disintegrate them, otherwise than by excessive mechanical treatment.

The phospho-protein, casein, is practically water insoluble but may be dissolved or diffused in all the alkalis and many of the alkali salts. Casein is a weak diabasic acid, forming acid and neutral salts with alkalis. It is also soluble in strong hydrochloric acid.

I have ascertained that an exceedingly small percentage of casein in a feebly alkaline solution of sodium or potassium hydroxide exerts powerful hydrating and dispersion properties on finely divided sulphur when the sulphur is suspended in a water solution of this alkaline protein. It is known that casein has attractive properties with reference to emulsion forming characteristics where oil and water diffusions are required. However, its value as an emulsifier is not as high as some other compounds used for this purpose.

Records state that sulphur of a colloidal nature may be obtained by treating sodium pentasulphide with phosphoric acid. Phosphoric acid seems to have the property of jelling or hydrating the precipitated sulphur, a characteristic that other acids do not seem to have in this particular case. It would seem, therefore, that casein, which is a phospho protein, would have like characteristics when brought into contact with finely divided crystalline sulphur and no doubt casein derives some of its excellent hydrating and dispersing properties from the phosphoric acid contained in the compound.

Sulphur readily assumes the colloidal state and colloid sulphur, as well as sulphur of a colloidal nature, may be produced by various precipitation methods. These methods, however, require dilute solutions, considerable equipment for carrying out the different steps involved and much time is needed before the finished product is obtained. My method is economical and produces in a short period of time large quantities of finely divided or dispersed sulphur much desired by agriculturists.

My method is as follows:

To 97½ parts of water at about 30° C, I add 2 parts of acid-free powdered casein, gradually stirring until the powdered casein is thoroughly suspended in the water. I then add to this mixture fused sodium hydrate until the solution is slightly alkaline. About one-half part by weight of the sodium hydroxide suffices. To this alkaline protein solution I gradually add 200 parts of finely pulverized or ground sulphur, keeping batch feebly alkaline throughout the addition of the sulphur. When thoroughly mixed, the materials are stirred, rubbed together or ground for a period of time. During the mixing or grinding, tests are made for alkalinity and the batch kept slightly alkaline throughout the processing. If too much sodium hydroxide is present, a decomposition of the casein results and an ammonia is liberated. The decomposition of the casein naturally detracts from the efficiency of the dispersion agent. Furthermore, an excess of caustic would also tend to form a sulphide solution which is not desired. If more sodium hydroxide is found to be present than is required, it is neutralized with phosphoric acid. The presence of a small quantity of sodium phosphate is not objectionable in the finished product, as it promotes chemical activity when the product is used for agricultural purposes.

It is also necessary that the stirring, rubbing or grinding of the batch take place below the surface, as excessive agitation at or near the surface produces a froth-like foam, the sulphur being lifted out of the presence of the agent necessary in obtaining the product desired. This is prevented, of course, by not breaking the surface of the batch any more than possible while processing, or, if it does happen, the forming may be overcome by sprinkling a small quantity of the dry pulverized sulphur on the surface of the batch.

Toward the end of the period of treatment, 2 to 4 parts by weight of an anhydrous compound, for example, gelatine or clay, is added for the purpose of taking up any excess water solution that may be present in the material.

As I have said before, casein is practically insoluble in water and may be precipitated from its alkaline solutions by an acid, hence the adsorbed sulphur particles in my sulphur product, as produced by this method, are coagulated or precipitated on the addition of an acid, even the weak organic acids having this effect. However, the fact that my sulphur product is decomposed on the addition of a weak acid is highly desirable, as it is quite necessary that the acidity of the sulphur be promoted when it is applied or used in agriculture. The weak organic acid, carbon dioxide, given off from plant foliage serves this purpose.

What I claim is:—

1. The method of producing a sulphur product, comprising a treatment of pulverized sulphur in the presence of an alkaline protein compound, causing a dispersion of the sulphur and producing a finely comminuted sulphur product.

2. The method of producing a sulphur product, comprising the treatment of pulverized sulphur with an alkaline protein water solution to cause a dispersion of the sulphur and producing a finely comminuted sulphur product.

3. The method of producing a sulphur product, comprising the treatment of pulverized sulphur in the presence of a small percentage of an alkaline protein compound, causing a dispersion of the sulphur and producing a finely comminuted sulphur product.

4. The method of producing a sulphur product, comprising the treatment of pulverized sulphur in the presence of a water insoluble protein suspended in water and then dissolved in a water solution of a soluble alkali, this solution being adapted to act as a dispersion agent upon the sulphur and to produce a finely comminuted sulphur product.

5. The method of producing a sulphur product, comprising the treatment of pulverized sulphur in the presence of a water insoluble protein suspended in water and then dissolving the protein in a water solution of a soluble alkali, keeping the batch slightly alkaline, the protein solution acting as a dispersion agent upon the sulphur and producing a finely comminuted sulphur product.

6. The method of producing a sulphur product, comprising the suspending of pulverized sulphur and a small percentage of powdered casein in water and dissolving the casein in a water solution of sodium hydrate, forming an alkaline protein solution which acts as a dispersion agent on the sulphur and produces a finely comminuted sulphur product.

7. The method of producing a sulphur product, comprising the suspending of pulverized sulphur in an alkaline solution of protein, stirring the batch for a period of time while keeping the surface from excessive agitation, the protein acting as a dispersion agent and producing a finely comminuted sulphur product.

8. The method of producing a sulphur product, comprising the suspending of pulverized sulphur in an alkaline solution of protein, grinding the batch for a period of time while keeping the surface from excessive agitation, the protein acting as a dispersing agent and producing a finely comminuted sulphur product.

9. The method of producing a sulphur product, comprising the suspending of pulverized sulphur in an alkaline solution of protein, stirring and grinding the batch for a period of time while keeping the surface from excessive agitation, the protein acting as a dispersion agent and producing a finely comminuted sulphur product.

Signed at New York, in the county of New York and State of New York, this 5th day of Jan. A. D. 1925.

WILLIAM C. PIVER.